US011543515B2

(12) United States Patent
Lehner et al.

(10) Patent No.: US 11,543,515 B2
(45) Date of Patent: Jan. 3, 2023

(54) DEVICE FOR ELECTROMAGNETICALLY PROBING A SAMPLE

(71) Applicant: PROCEQ SA, Schwerzenbach (CH)

(72) Inventors: Samuel Lehner, Zurich (CH); Ralph Mennicke, Uster (CH)

(73) Assignee: PROCEQ SA, Schwerzenbach (CH)

(*) Notice: Subject to any disclaimer, the term of this patent is extended or adjusted under 35 U.S.C. 154(b) by 566 days.

(21) Appl. No.: 16/491,923

(22) PCT Filed: Mar. 10, 2017

(86) PCT No.: PCT/CH2017/000027
§ 371 (c)(1),
(2) Date: Sep. 6, 2019

(87) PCT Pub. No.: WO2018/161182
PCT Pub. Date: Sep. 13, 2018

(65) Prior Publication Data
US 2021/0141081 A1 May 13, 2021

(51) Int. Cl.
G01S 13/88 (2006.01)
G01S 7/02 (2006.01)
(Continued)

(52) U.S. Cl.
CPC ............ G01S 13/887 (2013.01); G01S 7/02 (2013.01); H01Q 1/42 (2013.01); H01Q 1/526 (2013.01); G01S 7/027 (2021.05)

(58) Field of Classification Search
CPC .......... G01S 13/887; G01S 7/02; G01S 7/027; G01S 7/03; G01S 13/88; G01S 2007/027;
(Continued)

(56) References Cited
U.S. PATENT DOCUMENTS 4,967,199 A * 10/1990 Gunton ............... G01S 13/0209
342/158
6,657,577 B1 * 12/2003 Gregersen ............... H01Q 3/04
342/22
(Continued)

FOREIGN PATENT DOCUMENTS

DE 10 2012 111183 5/2014
DE 10 2014 218364 3/2016
(Continued)

OTHER PUBLICATIONS

Int'l Search Report (form PCT/ISA/210) conducted in Int'l Appln. No. PCT/CH2017/000027 (dated Dec. 15, 2017).
(Continued)

Primary Examiner — Bernarr E Gregory
Assistant Examiner — Yonghong Li
(74) Attorney, Agent, or Firm — Greenblum & Bernstein, P.L.C.

(57) ABSTRACT

A device for the non-destructive probing of a sample by means of electromagnetic wave reflection includes a metal body as part of its frame. The metal body forms a lateral wall and a separating wall enclosing an interior space. On a first side of the metal body, a shielding structure forms a plurality of shielded chambers for receiving RF circuitry. Interior space faces the second side of the metal body. A first circuit board containing driver and receiver circuitry is mounted to the first side of the metal body, and a second circuit board containing an antenna structure is mounted to the second side thereof.

19 Claims, 4 Drawing Sheets

(51) Int. Cl.
*H01Q 1/42* (2006.01)
*H01Q 1/52* (2006.01)

(58) Field of Classification Search
CPC .. G01S 7/42; G01S 13/95; H01Q 1/42; H01Q 1/526; H01Q 1/52; H01Q 1/525; H01Q 17/007; G01V 3/40; H05K 1/18
See application file for complete search history.

(56) References Cited

U.S. PATENT DOCUMENTS

| | | | |
|---|---|---|---|
| 7,180,440 B2* | 2/2007 | Schmidt | G01D 5/2405 |
| | | | 342/175 |
| 7,196,655 B1* | 3/2007 | Hayles, Jr. | G01S 13/78 |
| | | | 342/11 |
| 7,518,880 B1 | 4/2009 | Ziberna | |
| 8,474,161 B2* | 7/2013 | Cunningham | B66C 23/18 |
| | | | 37/403 |
| 2013/0207830 A1 | 8/2013 | Watts et al. | |
| 2014/0104094 A1 | 4/2014 | Feigin | |
| 2015/0293220 A1 | 10/2015 | Feigin | |
| 2016/0103215 A1 | 4/2016 | Watts et al. | |
| 2016/0268693 A1 | 9/2016 | Ding et al. | |
| 2017/0261444 A1 | 9/2017 | Krapf et al. | |

FOREIGN PATENT DOCUMENTS

| | | |
|---|---|---|
| EP | 2 631 680 | 8/2013 |
| EP | 2 720 065 | 4/2014 |
| RU | 2282875 | 8/2006 |
| WO | 2016/144956 | 9/2016 |

OTHER PUBLICATIONS

Int'l Written Opinion (form PCT/ISA/220 & PCT/ISA/237) conducted in Int'l Appln. No. PCT/CH2017/000027 (dated Dec. 15, 2017).
Russia Search Report conducted in counterpart Russia Appln. No. 2019128236/28(055492) (dated May 22, 2020) (w/ translation).
Russia Decision to Grant conducted in counterpart Russia Appln. No. 2019128236/28(055492) (dated May 25, 2020) (w/ translation).

* cited by examiner

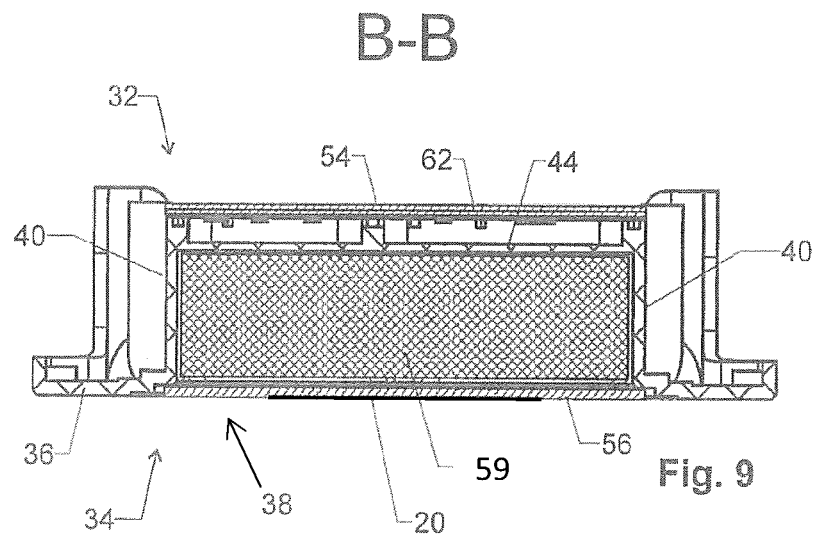
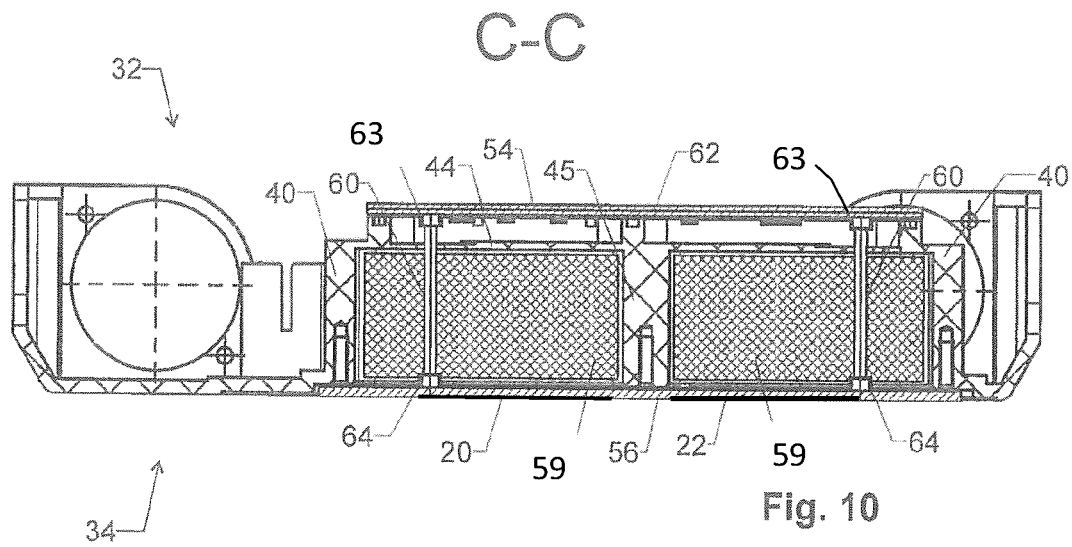

DEVICE FOR ELECTROMAGNETICALLY PROBING A SAMPLE

TECHNICAL FIELD

The invention relates to a device for the non-destructive probing of a sample, in particular a structure of concrete, by means of electromagnetic wave reflection.

BACKGROUND ART

EP 2720065 describes a device of this type. It comprises a housing-like frame with four wheels. Electromagnetic waves are sent into the sample by means of an antenna structure. Echo signals reflected back from the sample are received by the antenna structure and analyzed.

DISCLOSURE OF THE INVENTION

The problem to be solved by the present invention is to provide a device of this type that is easy to construct.

This problem is solved by the device of claim 1. Accordingly, the device comprises:
  A frame: This is the mechanical framework of the device.
  An antenna structure: This may be a single antenna acting as a sender and a receiver, or it may comprise two separate antennas for sending and receiving the signals, respectively.
  A driver: The driver comprises at least the output stage of the electronics generating the probe signal. It is electrically connected to the antenna structure for sending the probe signal through the same.
  A receiver: The receiver comprises at least the input stage of the electronics for receiving the echo signal. It is electrically connected to the antenna structure for receiving the echo signal through the same.
  At least a first circuit board: At least part of the driver and/or the receiver is arranged on this first circuit board.
  At least a second circuit board: The antenna structure is arranged on this second circuit board.
  A metal body: This metal body is arranged in the frame (by forming part of the frame or by being mounted to the frame). The metal body has first and second opposite sides.
  At least one electrical connector: This connects the two circuit boards.

Further, the first circuit board is mounted to the first side of the metal body and the second circuit board is mounted to the second side of said circuit body.

Hence, this design allows a simple mounting of both circuit boards to opposite sides of the metal body as a common carrier. The metal body forms a mount as well as a spacer between the two boards.

Advantageously, the metal body comprises a lateral wall that circumferentially encloses an interior space, i.e. that surrounds the interior space an all sides with the possible exception of the sides of the first and second sides. The interior space is adjacent to the second side of the metal body, and the antenna structure is adjacent to the interior space. This design electrically shields the interior space and therefore the side of the antenna structure that faces away from the sample. Advantageously, the lateral wall extends laterally outside the antenna structure such that all of the antenna structure borders the interior space.

The metal body can further comprise a separating wall closing the interior space towards the first side. This separating wall shields the antenna structure from the circuit board carrying the driver and receiver.

The device can further comprise a damping structure, advantageously separate from the metal body, arranged in the interior space in order to absorb and thereby damp the waves emitted by the antenna structure into the metal body and to suppress reflections originating from that side. Advantageously, the damping structure can comprise a conductive foam.

The metal body can further comprise a shielding structure that extends between the separating wall and the first circuit board. It forms several mutually shielded chambers between the separating wall and the first circuit board. This allows to shield different parts of the circuitry on the first circuit board from each other. In particular, circuitry of the driver and circuitry of the receiver are backed by different shielded chambers, i.e. separate shielded chambers are located between the driver and the receiver circuitry and the separating wall.

In a further embodiment, the antenna structure comprises a sender antenna for sending the probe signal into the sample and a receiver antenna for receiving an echo of the probe signal reflected from the sample. In this case, the metal body advantageously comprises a shield wall that shields the receiver antenna from the sender antenna in order to reduce direct crosstalk between these antennas. The shield wall ends at the second circuit board, i.e. at the circuit board carrying the antenna structure.

Advantageously, the shield wall extends between the second circuit board and the separating wall and divides said interior space into a first chamber backing the sender antenna and a second chamber backing the receiver antenna. In this context, "backing" is to be understood such that the respective chambers are located between the respective antennas and the separating wall.

The connector can be plugged into the first and/or the second circuit board, thereby forming a releasable connection for easier assembly and disassembly.

The present device can be used for probing the structure of any kind of sample, but it is advantageously used for probing the structure of concrete, e.g. of a building, tunnel or bridge.

BRIEF DESCRIPTION OF THE DRAWINGS

The invention will be better understood and objects other than those set forth above will become apparent when consideration is given to the following detailed description thereof. This description makes reference to the annexed drawings, wherein:

FIG. 9 is the sectional view of FIG. 7 including some parts of the electronics and the damping structure, and FIG. 10 is the sectional view of FIG. 8 including some parts of the electronics and the damping structure.

MODES FOR CARRYING OUT THE INVENTION

Overview

Figure 1:
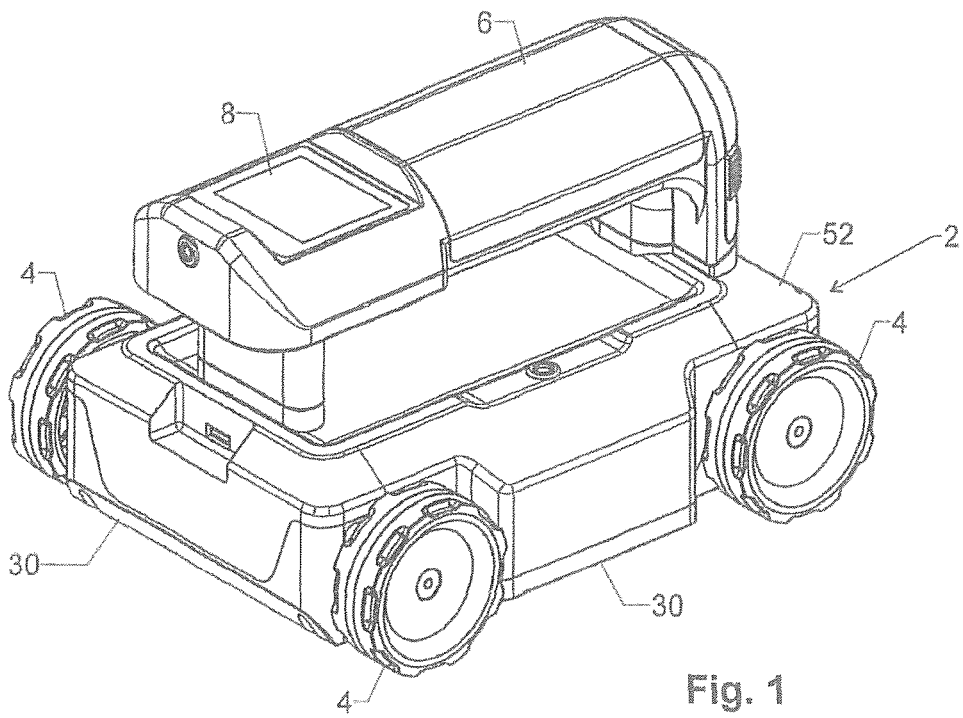
FIG. 1 shows a view of a device.

FIG. 1 shows a device for determining the structure of a sample by means of electromagnetic reflection measurements.

It comprises a frame 2 forming a housing enclosing the electronic components of the device.

In the embodiment shown here, the device comprises a set of wheels 4, in particular four wheels, by means of which the device can be guided along the sample at a defined distance therefrom. Instead of four wheels, the device can e.g. also have only two or three wheels, or wheel-like components, such as rollers or sliders.

Further, the housing comprises, at a side opposite to the wheels 4, a handle 6 to be gripped by the user.

The device also comprises input and output devices, such as a touchscreen 8.

Figure 2:
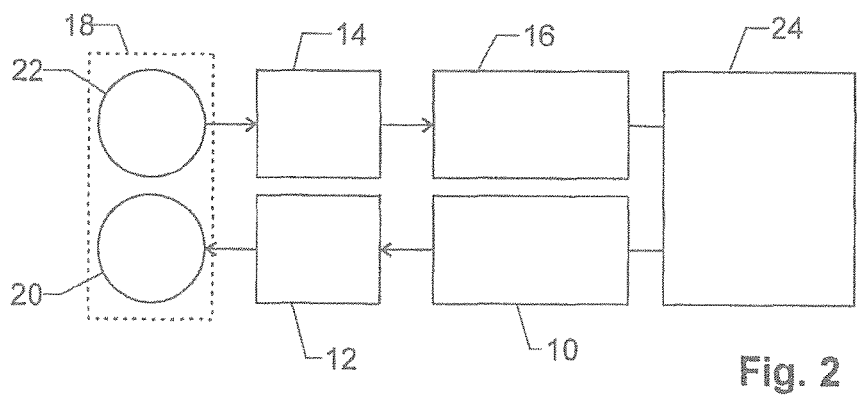
FIG. 2 shows a block circuit diagram of the device.
Figure 3:
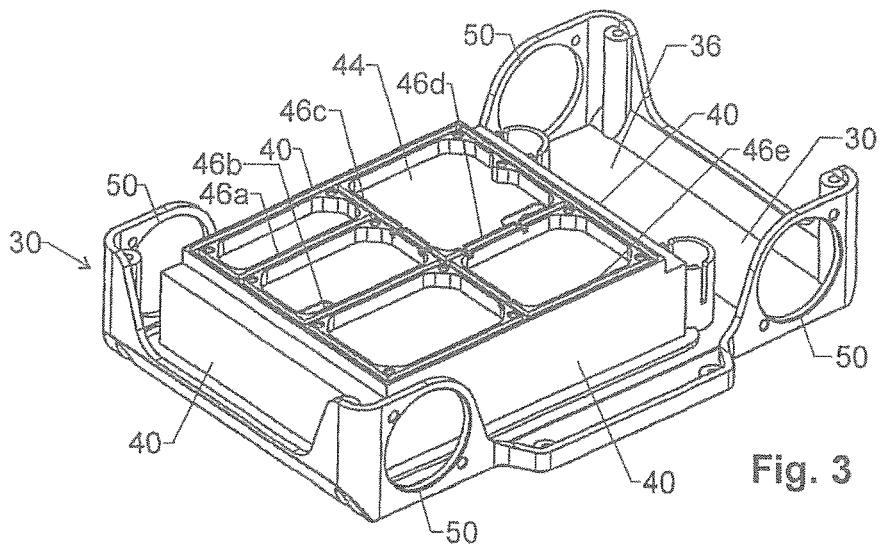
FIG. 3 shows a metal body to be used in the device.

FIG. 2 shows some of the electronic components within the device. These include, by way of example, the following parts:

A driver 10, 12 for generating a probe signal to be sent into the sample. Driver 10, 12 e.g. includes a digital section 10 as well as an analog section 12. Digital section 10 can e.g. be used to generate a pulse or a CW signal, and analog section 12 can be used to amplify and/or modulate and/or filter this signal.

A receiver 14, 16 for receiving an echo signal from the sample. It can e.g. include an analogue section 14 for filtering and/or demodulating and/or amplifying the received signal as well as a digital section 16 for further signal processing.

An antenna structure 18 for sending the probe signal into the sample and for receiving the echo signal reflected therefrom. In the present embodiment, antenna structure 18 comprises a sender antenna 20 and, separate from the sender antenna 20, a receiver antenna 22. Driver 10, 12 is connected to sender antenna 20 and receiver 14, 16 is connected to receiver antenna 22.

A control unit 24 for controlling the components in the device, for operating screen 8 and for communication with external circuitry.

In operation, the user typically moves the device along the sample while control unit 24 performs a stream of measurements. Control unit 24, or circuitry external to the device, can use the recorded data in order to determine the sample's internal structure, e.g. using SAFT (Synthetic Aperture Focusing Technique) technology as it is known to the skilled person.

Mechanical Design:

A core of the device of FIG. 1 is formed by a metal body 30. This metal body can e.g. form the bottom side of frame 2. It is shown in FIGS. 2-8.

Figure 5:
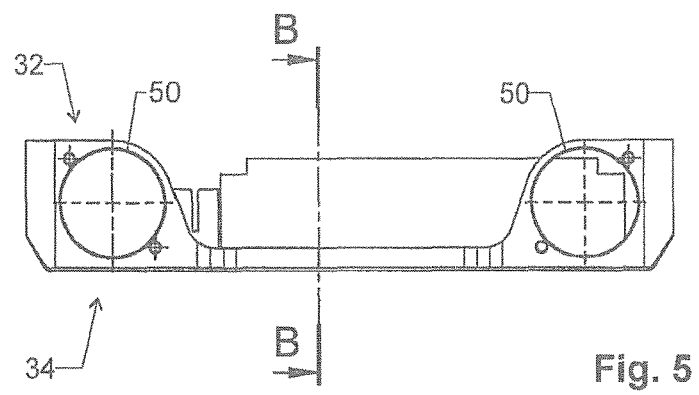
FIG. 5 is a side view of the metal body.
Figure 7:
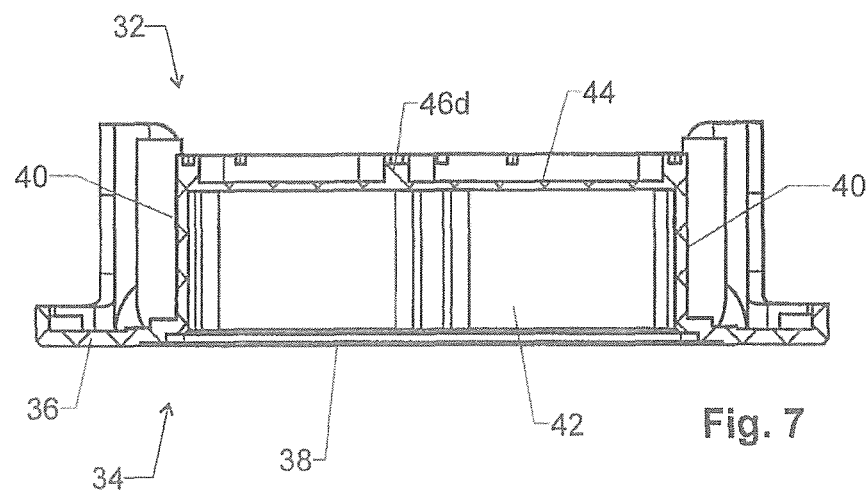
FIG. 7 is a sectional view along line B-B of FIG. 5.
Figure 8:
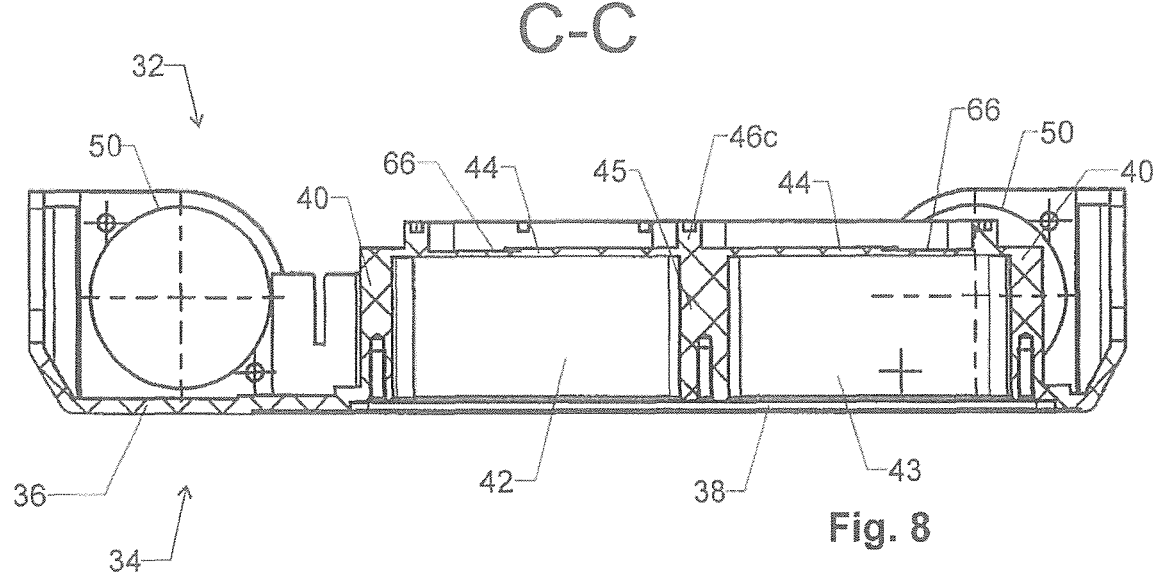
FIG. 8 is a sectional view along line C-C of FIG. 4.

Metal body 30 is advantageously a single piece of cast and/or worked metal, in particular aluminum. It comprises a first side 32 and a second side 34 (FIGS. 5, 7, 8). In operation, first side 32 is facing away from the sample, while second side 34 is located on the side of frame 2 where the wheels 4 are mounted, i.e. second side 34 faces the sample to be measured.

Metal body 30 comprises a base plate 36 (FIGS. 7, 8) at its second side 34. It forms a wall of frame 2 towards the sample.

An opening 38 is arranged in base plate 36.

On the side of base plate 36 that faces away from second side 34, metal body 30 forms a lateral wall that extends around opening 38. Lateral wall 40 is advantageously aligned perpendicularly to base plate 36.

Lateral wall 40 encloses, i.e. runs around, an interior space 42, 43.

Metal body 30 further forms a separating wall 44. It extends parallel to, and at a distance from, base plate 36 and borders interior space 42, 43.

Metal body 30 further forms a shield wall 45. It is perpendicular to base plate 36 and extends between two opposite sides of lateral wall 40, thereby dividing interior space 42, 43 into a first chamber 42 and a second chamber 43. Shield wall 45 extends between second side 34 (namely opening 38) and separating wall 44.

Further, metal body 30 forms a shielding structure 46a-46e (see FIGS. 3, 4, generally denoted by reference number 46 in the following) formed by a plurality of raised structures on the side of separating wall 44. Shielding structure 46 faces first side 32. It extends between separating wall 44 and first side 32 (i.e. between separating wall 44 and the first circuit board 54 mentioned below) and forms several, mutually shielded chambers 48a-48e (which are, in the following generally denoted by reference number 48 and shown in FIG. 4).

Metal body 30 further forms wheel holders 50 for holding bearings for the wheels 4 and therefore for holding the wheels 4.

Base plate 36 extends between lateral wall 40 and the wheel holders 50, thereby connecting these parts.

As shown in FIG. 1, frame 2 of the device further comprises a cover 52 mounted to the second side of metal body 30 and forming an upper side of the device's housing. Handle 6 is mounted to cover 52 or forms a part thereof.

As shown in FIGS. 9 and 10, metal body 30 is used for mounting two circuit boards 54, 56.

Figure 4:
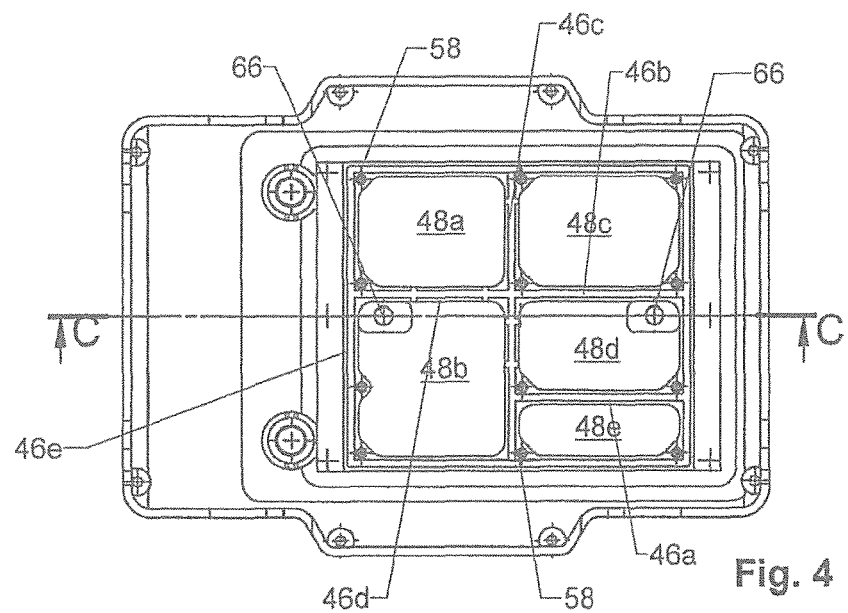
FIG. 4 is a view of the metal body from its first side.

A first circuit board 54 is attached to first side 32 of metal body 30, namely to shielding structure 46, e.g. by means of screws (sitting in screw openings some of which are denoted with reference number 58 in FIG. 4). Shielding structure 46 extends along the edge of first circuit board 54 thereby shielding it.

Figure 6:
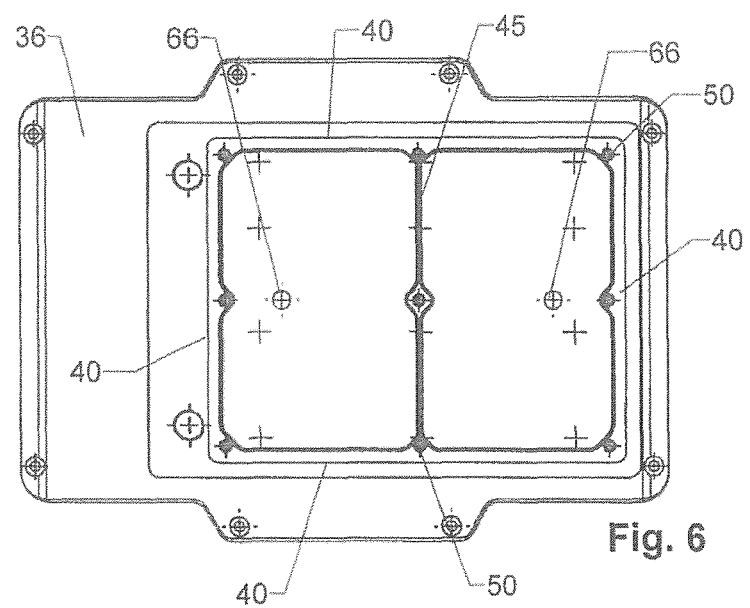
FIG. 6 is a view of the metal body from its second side.

A second circuit board 56 is attached to second side 34 of metal body 30, again e.g. by means of screws (sitting in screw openings, some of which are denoted with reference number 50 in FIG. 6). Second circuit board 56 is mounted over opening 38 (FIG. 7, 8). Lateral wall 40 extends along the edge of second circuit board 56 thereby shielding it.

First circuit board 54 holds at least part of the electronics of driver 10, 12 and/or of receiver 14, 16. Advantageously, it holds at least the analog parts 12 and 14 thereof.

First circuit board 54 can be a multi-layer PCB comprising a shield layer 62 that provides radio frequency shielding to the components above it. In this case, at least some of the electronic components of the sender 10, 12 and/or the receiver 14, 16 are on the side of shield layer 62 that faces second side 34 of metal body 30 in order to be shielded.

In order to avoid crosstalk, different parts of the circuitry on first circuit board 54 are located in different ones of the shielded chambers 48. In particular, the circuitry of the driver and the circuitry of the receiver are backed by different ones of the shielded chambers 48.

Second circuit board 56 holds the two antennas 20, 22, which can e.g. be implemented as circular conductive regions or in a bow-tie arrangement structured in a conductive layer of second circuit board 56.

Sender antenna 20 and receiver antenna 22 are on opposite sides of shield wall 45 in order to reduce cross-talk between them.

Further, and as shown in FIGS. 9 and 10, the device further comprises a damping structure 59 arranged in interior space 42, 43, namely in first chamber 42 and second chamber 43. Damping structure 59 is an extended structure, advantageously separate from metal body 30. It is designed to absorb electromagnetic radiation (of the frequencies used by the device) without reflecting it. For example, damping structure 59 can be a conductive foam, e.g. a foam comprising graphite.

In order to have a large volume available for damping structure 59 separating wall 44 is advantageously closer to first circuit board 54 than to second circuit board 56.

As mentioned, all of antenna structure 18, i.e. both antennas 20, 22, is backed by interior space 42, 43 such that all the backside of antenna structure 18 is damped.

In the present case, first chamber 42 is arranged at the backside of antenna 20 and second chamber 43 is arranged at the backside of antenna 22.

The antennas 20, 22 on second circuit board 56 have to be electrically connected to first circuit board 54. For this purpose, the present device is provided with at least one electrical connector 60 extending between first and second circuit boards 54, 56. For easy assembly, this electrical connector is plugged into one or both of the circuit boards 54, 56.

In the embodiment of FIGS. 9 and 10, there are two such connectors 60. Each connector 60 is a rigid rod having a first plug 63 plugged into first circuit board 54 and/or a second plug 64 plugged into second circuit board 56.

Advantageously, each connector extends perpendicularly to the circuit boards 54, 56.

For each connector 60, separating wall 44 comprises an opening 66 (FIGS. 4 and 6) with the connector 60 extending through it.

Notes:

Even though, in the present embodiment, each of the first and second circuit boards 54, 56 is formed by a single board, it is possible to assemble each of them from two or more boards, each such board only holding part of the circuitry and antenna structure, respectively. However, using single boards is advantageous because it makes it easier to assemble the device.

While there are shown and described presently preferred embodiments of the invention, it is to be distinctly understood that the invention is not limited thereto but may be otherwise variously embodied and practiced within the scope of the following claims.

The invention claimed is:

1. A device for the non-destructive probing of a sample by electromagnetic wave reflection, said device comprising:
   a frame,
   an antenna structure,
   a driver electrically connected to said antenna structure for sending a probe signal through said antenna structure,
   a receiver electrically connected to said antenna structure for receiving an echo signal through said antenna structure,
   at least a first circuit board, wherein at least part of said driver and/or said receiver is arranged on said first circuit board,
   at least a second circuit board, wherein said antenna structure is arranged on said second circuit board,
   a metal body arranged in said frame having first and second opposite sides,
   at least one electrical connector for electrically connecting said first and second circuit boards,
   wherein said first circuit board is mounted to the first side of said metal body and said second circuit board is mounted to the second side of said metal body.

2. The device of claim 1 wherein said metal body comprises a lateral wall circumferentially enclosing an interior space adjacent to said second side, wherein said antenna structure is adjacent to said interior space, and in particular wherein the lateral wall extends laterally outside the antenna structure.

3. The device of claim 2 further comprising a damping structure arranged in said interior space, and in particular wherein said damping structure is separate from said metal body.

4. The device of claim 3 wherein said damping structure comprises a conductive foam.

5. The device of claim 2 wherein said metal body comprises a separating wall closing said interior space towards said first side, and in particular wherein said separating wall is closer to said first circuit board than to said second circuit board.

6. The device of claim 5 wherein said metal body comprises a shielding structure extending between said separating wall and said first circuit board and forming several mutually shielded chambers between said separating wall and said first circuit board.

7. The device of claim 6 wherein circuitry of the driver and circuitry of the receiver are backed by different ones of said shielded chambers.

8. The device of claim 5 wherein said separating wall comprises an opening and wherein said connector extends through said opening.

9. The device of claim 1 wherein said antenna structure comprises a sender antenna and a receiver antenna.

10. The device of claim 9 wherein said metal body comprises a shield wall shielding said receiver antenna from said sender antenna, wherein said shield wall ends at said second circuit board.

11. The device of claim 10 wherein said shield wall extends between said second circuit board and said separating wall dividing said interior space into a first chamber backing said sender antenna and a second chamber backing said receiver antenna.

12. The device of claim 1 wherein said electrical connector is a rigid rod having a first plug plugged into said first circuit board and/or a second plug plugged into said second circuit board, and in particular wherein said device comprises at least two such electrical connectors.

13. The device of claim 1 wherein said connector is plugged into said first and/or said second circuit board.

14. The device of claim 1 wherein said first and/or said second circuit board is/are attached to said metal body.

15. The device of claim 1 wherein said metal body is a single metal piece, in particular of aluminum.

16. A device for the non-destructive probing of a sample by electromagnetic wave reflection, said device comprising:
   a frame,
   an antenna structure,
   a driver electrically connected to said antenna structure for sending a probe signal through said antenna structure,
   a receiver electrically connected to said antenna structure for receiving an echo signal through said antenna structure, at least a first circuit board, wherein at least part of said driver and/or said receiver is arranged on said first circuit board, at least a second circuit board, wherein said antenna structure is arranged on said second circuit board, a metal body arranged in said frame having first and second opposite sides, at least one electrical connector for electrically connecting said first and second circuit boards, wherein said first circuit board is mounted to the first side of said metal body and said second circuit board is mounted to the second side of said metal body, wherein said device further comprises a set of wheels for rolling it along said sample, wherein said wheels are mounted to said metal body, and wherein said metal body comprises:
 wheel holders for holding said wheels, and
 a base plate at the second side that extends between a lateral wall and said wheel holders.

17. The device of claim 16
wherein said second circuit board is arranged in an opening of said base plate.

18. A method for probing the structure of concrete comprising using the device of claim 1.

19. A device for the non-destructive probing of a sample by electromagnetic wave reflection, said device comprising a frame, an antenna structure, a driver electrically connected to said antenna structure, wherein said driver includes a digital section for generating a pulse or a CW signal and an analog section for amplifying and/or modulating and/or filtering said signal, a receiver electrically connected to said antenna structure, wherein said receiver comprises an analog section for filtering and/or demodulating and/or amplifying an echo signal as well as a digital section for further signal processing, at least a first circuit board, wherein at least said analog section of said driver and/or said receiver is arranged on said first circuit board, at least a second circuit board, wherein said antenna structure is arranged on said second circuit board, a metal body arranged in said frame having first and second opposite sides, at least one electrical connector for electrically connecting said first and second circuit boards, wherein said first circuit board is mounted to the first side of said metal body and said second circuit board is mounted to the second side of said metal body.

* * * * *